United States Patent [19]

Mackey, Sr. et al.

[11] Patent Number: 5,080,954
[45] Date of Patent: Jan. 14, 1992

[54] SURFACE COVERING WITH INVERSE SPHERULITE PATTERNS

[75] Inventors: Joseph L. Mackey, Sr., Lancaster; William Y. Whitmore, Hellam, both of Pa.

[73] Assignee: Armstrong World Industries, Inc., Lancaster, Pa.

[21] Appl. No.: 362,306

[22] Filed: Jun. 6, 1989

[51] Int. Cl.$^5$ .................. B32B 3/30; D06N 7/04; B29C 59/02

[52] U.S. Cl. ..................... 428/141; 428/156; 428/172; 428/195; 428/500; 428/516; 428/910; 156/209; 264/284; 427/264

[58] Field of Search .............. 428/141, 156, 172, 195, 428/500, 516, 910; 156/209; 264/284; 427/264

[56] References Cited

U.S. PATENT DOCUMENTS

| | | | |
|---|---|---|---|
| 2,819,181 | 1/1958 | Thomas | 427/264 |
| 3,373,237 | 3/1968 | Mihalik et al. | 264/141 |
| 3,393,106 | 7/1968 | Marrinan et al. | 264/214 |
| 3,507,733 | 4/1970 | Davidson | 156/247 |
| 3,773,545 | 11/1973 | Erb et al. | 117/64 R |
| 4,131,663 | 12/1978 | Lewicki, Jr. | 428/172 X |
| 4,158,070 | 6/1979 | Lewicki, Jr. et al. | 427/264 X |
| 4,255,217 | 3/1981 | Franze | 264/284 |
| 4,273,819 | 6/1981 | Schmidle et al. | 427/264 X |
| 4,287,249 | 9/1981 | Eustance et al. | 428/141 |
| 4,456,643 | 6/1984 | Colzer | 428/156 |
| 4,478,663 | 10/1984 | O'Sullivan | 156/203 |
| 4,522,887 | 6/1985 | Koebisu et al. | 428/516 X |
| 4,608,294 | 8/1986 | Courtoy et al. | 427/264 X |
| 4,614,680 | 9/1986 | Fry et al. | 428/141 X |
| 4,761,320 | 8/1988 | Coburn, Jr. | 428/172 X |

FOREIGN PATENT DOCUMENTS

| | | | |
|---|---|---|---|
| 687545 | 5/1964 | Canada | 264/284 |
| 0006435 | 1/1985 | Japan | 264/284 |
| 2080024 | 4/1987 | Japan | 264/284 |
| 7706963 | 12/1978 | Netherlands | 264/284 |

Primary Examiner—Patrick J. Ryan
Assistant Examiner—William P. Watkins, III

[57] ABSTRACT

A surface covering, particularly a floor covering, has a visible surface with inverted images of spherulites. The inverted spherulities are formed on the visible surface by solidifying the visible surface while in contact with a release carrier having spherulities on its exposed surface. The level of gloss is determined by the number of inverted spherulite images and whether the images are impinging or non-impinging.

8 Claims, 4 Drawing Sheets

SURFACE COVERING WITH INVERSE SPHERULITE PATTERNS

FIELD OF THE INVENTION

The invention relates to release carriers used in the manufacture of surface coverings. In particular, the invention is directed to release carriers having a crystallizable polymer layer which can be treated to obtain predetermined areas of different predetermined gloss level and to remove defects in the polymer layer resulting from the handling and storage of the release carrier in rolls. The invention is also directed to surface coverings which are manufactured using the release carrier and the methods of making a release carrier and surface covering.

BACKGROUND OF THE INVENTION

The release carriers of the prior art are made by applying a polyolefin, preferably polypropylene, onto a continuous sheet of release paper, passing the polypropylene covered paper around a chill roll and rolling the release carrier onto a core for further processing, storage, shipment and handling. Since the polypropylene is set while in contact with the chill roll, it takes on the inverted image of the roll. Therefore, it is critical that the surface of the chill roll be defect free.

Even if the chill roll is maintained defect free, dull streaks are created in the release carrier due to gauge bands (the difference in caliber or thickness) of the release paper in the machine direction. It is common for 3,000 laps of release carrier to be wound into a 42 inch diameter roll. Due to the cumulative effect of the gauge bands, the difference in diameter across the roll is typically as much as ¼ inch. This leads to rubbing of the backside of the release paper against the adjacent polypropylene surface causing dull streaks in the high gloss polypropylene surface during handling and storage.

Presently, the surface defects are removed during manufacture of surface coverings such as vinyl floor coverings by pretreating the release carrier at the floor covering manufacturing site. As the release carrier is unrolled, the polypropylene is heated to a temperature greater than its melting point (in excess of 350° F.) and planished. While the dull streaks are removed by this process, the planisher must be maintained defect free.

Further, no known prior art release carrier has been made having two different predetermined gloss levels in predetermined areas of the release carrier.

Davidson, U.S. Pat. No. 3,507,733, discloses the use of a polypropylene coated release carrier in the manufacture of an embossed decorative surface covering.

Erb et al., U.S. Pat. No. 3,773,545, discloses a process for controlling the surface gloss of a vinyl coated floor covering. In particular, they disclosed the use of a hot polishing roll on a cool vinyl coated substrate to improve the gloss.

O'Sullivan, U.S. Pat. No. 4,478,663, discloses the use of a highly polished chill roll which has depressions of an average depth of about 5 microns and an average area for each depression of less than 16,000 square microns.

As evidenced by O'Sullivan, the teachings of the present invention can also be applied to products composed of laminates of plastics and other materials used in a variety of packages and containers such as plastic bags.

SUMMARY OF THE INVENTION

It is an object of the present invention to provide a method of making a release carrier which is simple and inexpensive yet avoids the disadvanatge of having to maintain a chill roll or planishing roll defect free.

It is a related object to provide a method of removing dull streaks from a release carrier prior to the use in the manufacture of a surface covering.

It is another object of the invention to provide a method for manufacturing a release carrier having predetermined areas of different predetermined gloss level.

In accordance with the invention, a crystallizable polymer layer of a release carrier is heated to above its melting point and cooled under controlled conditions. Predetermined areas of different predetermined gloss can be obtained by simultaneously subjecting a first area to one set of cooling conditions and subjecting a second area to a second set of cooling conditions. In a preferred method, a crystallizable polymer is cooled by contacting the surface of the release carrier opposite the polymer with the cold metal surface of a chill roll. The areas of differential gloss are obtained by using a chill roll with raised surfaces which contact the back surface of the relese carrier at predetermined first locations causing the crystallizable polymer to quench more quickly than the areas not contacted by the chill roll.

DETAILED DESCRIPTION OF THE INVENTION

As previously discussed, the release carriers of the prior art are made by applying a polyolefin, preferably polypropylene, to a release paper and quenching the polypropylene by contacting it with a chill roll.

Figure 1:
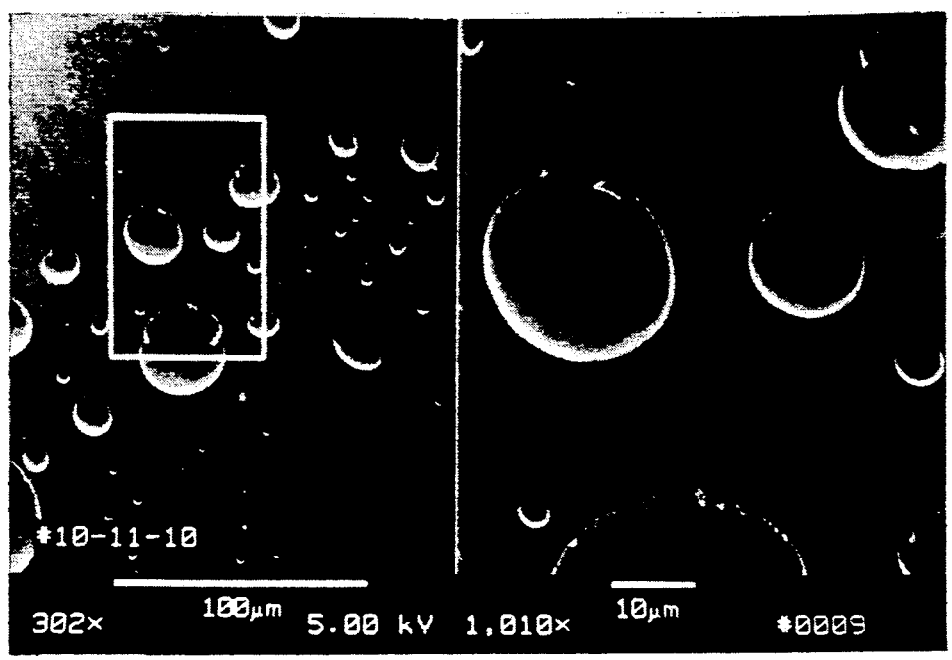
FIG. 1 is a photocopy of a SEM photograph of a prior art glossy release paper at 302× and 1,010× magnification.
Figure 3:
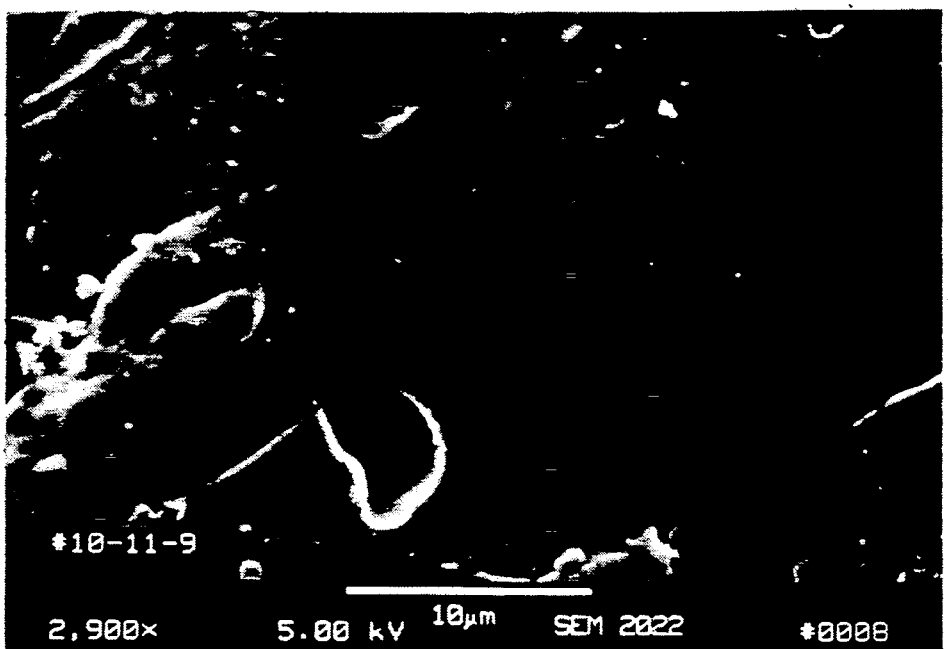
FIG. 3 is a photocopy of a SEM photograph of a prior art matte release paper at 2,900× magnification.

As shown in FIGS. 1 and 3, the polypropylene surface of the prior art release carrier essentially forms an inverted image of the chill roll. In FIG. 1, the parallel lines and irregular small indentations are a result of imperfections in the surface of the chill roll. To form the matted surface shown in FIG. 3, the chill roll is roughened such as by sandblasting. The larger substantially circular depressions in the polypropylene surfaces shown in FIGS. 1 and 3 are believed to be the result of gas bubbles trapped between the surface of the chill roll and the polypropylene during quenching.

Figure 2:
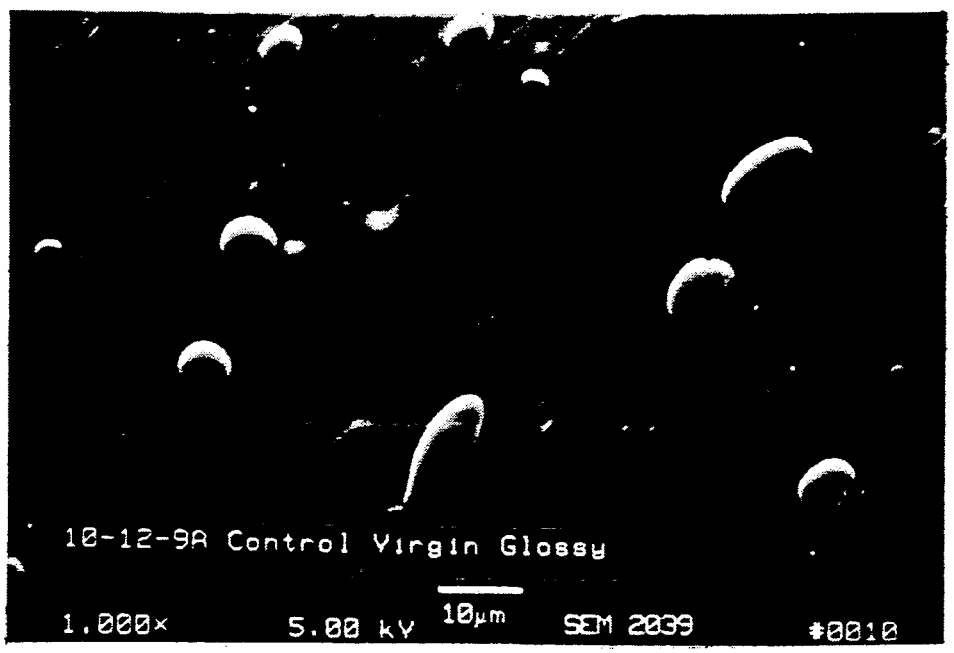
FIG. 2 is a photocopy of a SEM photograph of a prior art glossy surface covering produced using the release paper shown in FIG. 1 at 1,000× magnification.
Figure 4:
FIG. 4 is a photocopy of a SEM photograph of a prior art matte surface covering produced using the release paper shown in FIG. 3 at 2,900× magnification.
Figure 8:
FIG. 8 is a photocopy of a SEM photograph of a matte surface covering of the present invention produced using the release paper shown in FIG. 7 at 2,900× magnification.

FIGS. 2 and 4 show the surface of a surface covering which was formed on the release carriers of FIGS. 1 and 3. The rectangular indentation in FIG. 2 is the result of the prior taking of a higher magnification SEM photograph and should be ignored. The small specks which are apparent in some of the figures, particularly FIG. 8, are believed to be extraneous matter deposited on the surface during the SEM process and should also be ignored.

The essence of the present invention is the heating of the polyolefin or other crystallizable polymer layer of the release carrier and quenching of the layer without contacting the surface of the layer to remove defects in the surface of the prior art release carrier. By controlling the conditions during quenching, a desired level of gloss can be obtained.

ture and quenching the polypropylene by passing the heated release carrier through the nip of a chill roll and back roll with the polypropylene contacting the surface of the chill roll, the present inventors have eliminated the back roll and moved the chill roll to the back of the release carrier. Therefore, the melted polypropylene does not come in contact with any roll until after it has been quenched. Therefore, the defects in the chill roll are not transferred to the polypropylene surface. Further, by eliminating the nip, creasing, rippling and tracking problems with the release paper processing are drastically reduced.

Alternately, the polypropylene may be quenched in ambient air or in a temperature controlled chamber. In another embodiment, the polypropylene on the surface of the release carrier can be quenched by dry ice or a cold gas, such as that eminating from liquid nitrogen.

As shown in Table I, the level of gloss of the release carrier and surface covering can be controlled by controlling the temperature of the chill roll.

TABLE I

| | Quench Temp. Deg. F. | Release Carrier | | Surface Covering | |
|---|---|---|---|---|---|
| | | Spherulite Size (Microns) | Gloss (60 Deg.) | Spherulite Size (Microns) | Gloss (60 Deg.) |
| FIGS. 1 & 2 Prior Art (Glossy) | N/A | None | 79 | None | 54 |
| FIGS. 3 & 4 Prior Art (Matte) | N/A | None | 27 | None | 22 |
| FIGS. 5 & 6 (Glossy) | 60 | 1 to 3 | 75 | 1 to 3 | 48 |
| Not Shown (Semi-glossy) | 101 | 2 to 6 | 52 | 2 to 6 | 38 |
| FIGS. 7 & 8 (Matte) | 148 | 1 to 12 | 30 | 3 to 10 | 25 |

As crystallizable polymers, such as polyethylene, polytetrafloroethylene, polypropylene, polyvinyl alcohol, polyvinyl chloride and nylon, cool from above their melting points, they crystallize forming spherulites. The size of the spherulites depends on the rate of crystallization, which in turn depends on the rate of cooling or quenching. Rapid quenching prevents the development of crystallinity or substantially decreases it, reducing the size and number of the spherulites.

Figure 5:
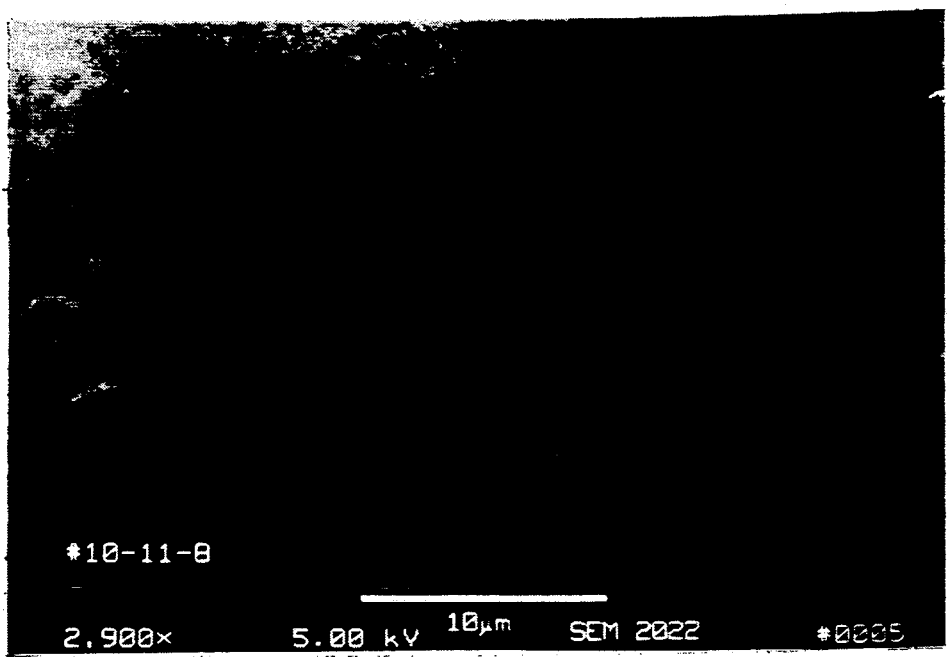
FIG. 5 is a photocopy of a SEM photograph of a glossy release paper of the present invention at 2,900× magnification.

As shown in FIG. 5, the surface of glossy release carriers of the present invention, has spherulites which are donut-shaped and about 1 to about 3 microns in diameter. Most of the spherulites in FIG. 5 are non-impinging.

Figure 7:
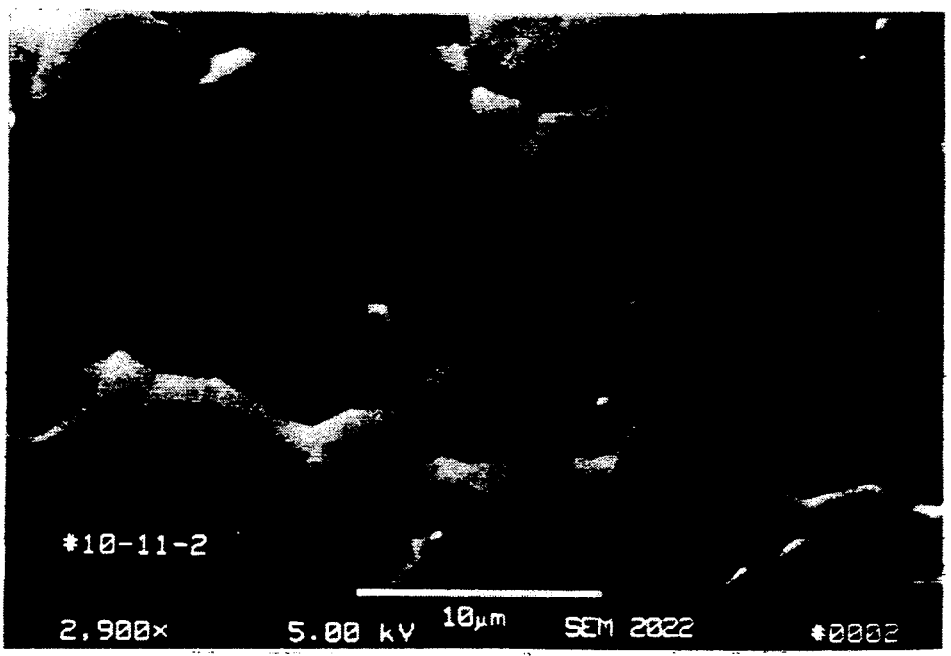
FIG. 7 is a photocopy of a SEM photograph of a matte release paper of the present invention at 2,900× magnification.

If the rate of quenching is decreased, the spherulites continue to grow until most of the spherulites impinge on adjacent spherulites as shown in FIG. 7. The spherulites on the surface of the matte release carrier in FIG. 7 are from about 1 to about 12 microns in dimension.

Figure 6:
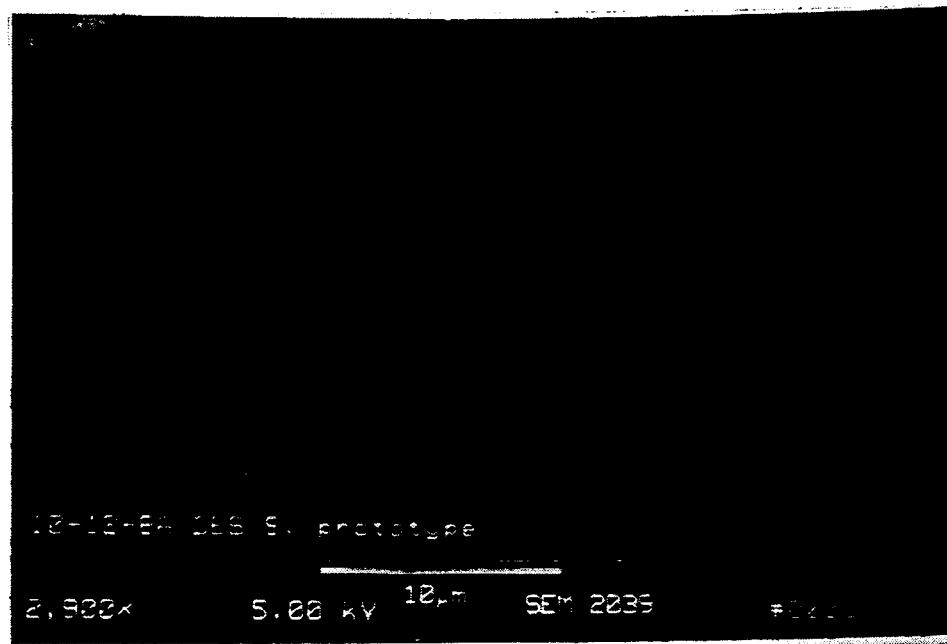
FIG. 6 is a photocopy of a SEM photograph of a glossy surface covering of the present invention produced using the release paper shown in FIG. 5 at 2,900× magnification.

Under a SEM, the glossy surface of a surface covering formed on the release carrier of FIG. 5 appear as donut-shaped indentations as shown in FIG. 6. Most of the inverted sperulite images are non-impinging, meaning that most of them are substantially circular in cross section.

The matte surface of a surface covering formed on the FIG. 7 release carrier appears as irregular shaped craters under a SEM as shown in FIG. 8. Most of the spherulites of the matte surface are impinging meaning that they have grown sufficiently in size to abut the adjacent spherulites and are therefore no longer spherical in cross section.

Rather than reconditioning the release carrier by heating the polypropylene to above its melting tempera- In the three examples of the present invention shown in Table I, the glossy release carrier of the prior art was reconditioned. Note that the gloss level of the reconditioned release carrier can be varied from glossy to matte. In a similar manner, the matte prior art release carrier has been reconditioned to a glossy release carrier as well as a matte release carrier.

Patterning of the release carrier can be obtained by forming predetermined areas of differential gloss. The differential gloss is obtained by cooling the melted crystallizable polymer under different cooling conditions.

The preferred method is to contact the surface of the release carrier opposite the crystallizable polymer with an embossed chill roll. The crystallizable polymer opposite the raised portions of the chill roll will be rapidly quenched and retain a high level of gloss. The area between the raised areas of the embossed chill roll will cool less rapidly and form areas of a lesser gloss level. Though not preferred, the areas of differential gloss can be obtained by contacting portions of the crystallizable polymer surface with the raised portions of a chill roll or other cooling device.

What is claimed is:

1. A surface covering comprising a polymeric layer having a visible surface, said visible surface having a gloss level, said visible surface further having indentations having the shape of inverted spherulite formations, wherein said indentations substantially determine said gloss level, and wherein said visible surface is substantially free of fibroids.

2. The surface covering of claim 1, wherein the visible surface has a predetermined first surface area of mostly non-impinging inverted spherulite indentations.

3. The surface covering of claim 2, wherein the visible surface has a predetermined second surface area of mostly impinging inverted spherulite indentations.

4. The surface covering of claim 1 wherein the surface covering is a floor covering.

5. The surface covering of claim 2 wherein the surface covering is a floor covering.

6. The surface covering of claim 3 wherein the surface covering is a floor covering.

7. The surface covering of claim 3 wherein the first surface area and the second surface area form a repeating pattern.

8. The surface covering of claim 7, wherein the surface covering is a floor covering.

* * * * *